(12) United States Patent
Hyon

(10) Patent No.: US 7,835,729 B2
(45) Date of Patent: Nov. 16, 2010

(54) EMOTICON INPUT METHOD FOR MOBILE TERMINAL

(75) Inventor: Seung-Taek Hyon, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 976 days.

(21) Appl. No.: 10/002,919

(22) Filed: Nov. 15, 2001

(65) Prior Publication Data

US 2002/0077135 A1    Jun. 20, 2002

(30) Foreign Application Priority Data

Dec. 16, 2000    (KR)    ............................... 2000-77441

(51) Int. Cl.
*H04M 3/00*    (2006.01)

(52) U.S. Cl. ................ 455/418; 455/466; 455/566; 455/414.1; 455/414.2

(58) Field of Classification Search ................ 455/567, 455/550, 466, 414.1, 566, 550.1, 418, 414.2; 345/758, 619, 418; 379/374; 715/741, 758; 704/270.1, 275
See application file for complete search history.

(56) References Cited

U.S. PATENT DOCUMENTS

| | | | |
|---|---|---|---|
| 5,784,001 A | | 7/1998 | Deluca et al. |
| 5,812,126 A * | | 9/1998 | Richardson et al. .......... 715/741 |
| 5,880,731 A * | | 3/1999 | Liles et al. .................... 715/758 |
| 5,889,852 A * | | 3/1999 | Rosecrans et al. ....... 379/355.05 |
| 6,044,248 A | | 3/2000 | Mochizuki et al. |
| 6,064,383 A * | | 5/2000 | Skelly ........................ 715/758 |
| 6,094,587 A * | | 7/2000 | Armanto et al. ............. 455/567 |
| 6,324,511 B1 * | | 11/2001 | Kiraly et al. ................. 704/260 |
| 6,405,225 B1 * | | 6/2002 | Apfel et al. .................. 715/526 |
| 6,453,294 B1 * | | 9/2002 | Dutta et al. ............... 704/270.1 |
| 6,539,240 B1 * | | 3/2003 | Watanabe .................... 455/566 |
| 7,039,676 B1 * | | 5/2006 | Day et al. .................... 709/204 |
| 7,272,419 B1 * | | 9/2007 | Schutze et al. .............. 455/566 |
| 2001/0049596 A1 * | | 12/2001 | Lavine et al. ................... 704/9 |
| 2001/0055036 A1 * | | 12/2001 | Burstrom .................... 345/758 |
| 2003/0158734 A1 * | | 8/2003 | Cruickshank ............... 704/260 |
| 2004/0002325 A1 * | | 1/2004 | Evans et al. .............. 455/414.1 |
| 2004/0070567 A1 * | | 4/2004 | Longe et al. ................. 345/156 |

FOREIGN PATENT DOCUMENTS

| | | |
|---|---|---|
| EP | 0 930 760 | 7/1999 |
| JP | 10-198615 | * 7/1998 |
| KR | 101999006320 | 1/1999 |
| WO | WO 00/57617 | 9/2000 |

* cited by examiner

*Primary Examiner*—Ajit Patel
*Assistant Examiner*—Khai M Nguyen
(74) *Attorney, Agent, or Firm*—The Farrell Law Firm, LLP

(57) ABSTRACT

There is provided a method of easily inputting icons representing user emotions (emoticons). In the emoticon input method in a mobile terminal, a plurality of emoticons, formed by utilizing a plurality of typical characters and special characters in combination, are grouped and stored by groups in the mobile terminal. The mobile terminal enters an emoticon input mode, displays the stored emoticon groups, displays the emoticons of an emoticon group selected by a user, stores an emoticon selected by the user, and transmits an SMS message including at least one emoticon selected by the user.

16 Claims, 5 Drawing Sheets

A. KOREAN INPUT MODE

ㄱ ㄴ ㄷ ㄹ ㅁ ㅂ ㅅ ㅇ ㅈ ㅊ ㅋ ㅌ ㅍ ㅎ ㅏ ㅑ ㅓ ㅕ ㅗ ㅛ ㅜ ㅠ ㅡ ㅣ

B. DIGIT INPUT MODE 1 2 3 4 5 6 7 8 9 0

C. SPECIAL CHARACTER/SYMBOL INPUT MODE

! @ # $ % ^ & * ( ) - = ~ ? ₩ ★ ○ ☆ ● ◇ ♡ ◉ ♣ ♥ ◐ . ♪ ....

A. KOREAN INPUT MODE

ㄱㄴㄷㄹㅁㅂㅅㅇㅈㅊㅋㅌㅍㅎㅏㅑㅓㅕㅗㅛㅜㅠㅡㅣ

B. DIGIT INPUT MODE 1 2 3 4 5 6 7 8 9 0

C. SPECIAL CHARACTER/SYMBOL INPUT MODE

A. SMILE

| ^_^ | ^)^ | ^L^ | ^_^" | ( | (^-^) |
|---|---|---|---|---|---|
| (^_^) | (^_^)V | (^_^) | *^_^* | <(*^▽^*)> | (*^o^*) |

B. LOVE

| ♡ | ♡.♡ | (^.^)KISS | ♥ | ♥.♥ | | |
|---|---|---|---|---|---|---|
| ʒ~~ʒ | (^3^)-* | (^.^)KISS | (o)(o) | (^3^)-* Chu!! | ♡ | (^*^)KISS |
| | | | | (^.-)σ... | | γ(^o^) yeah |

C. HAPPINESS

D. GREETING

E. FEAR

FIG. 5

EMOTICON INPUT METHOD FOR MOBILE TERMINAL

PRIORITY

This application claims priority to an application entitled "Emoticon Input Method for Mobile Terminal" filed in the Korean Industrial Property Office on Dec. 16, 2000 and assigned Serial No. 2000-77441, the contents of which are hereby incorporated by reference.

BACKGROUND OF THE INVENTION

1. Field of the Invention

The present invention relates generally to a mobile terminal, and in particular, to a method of easily inputting icons that represent emotions (emoticons) of a user.

2. Description of the Related Art

In addition to telephone calls, a mobile terminal can provide a variety of additional functions such as an SMS (Short Message Service). The SMS enables short text messages to be exchanged between terminals (or computers) regardless of whether the terminal of the other party is busy or not. The relatively high cost of voice calls makes the SMS cost-effective enough to substitute for the voice calls. A user inputs a text message using the keys of the keypad on the terminal and transmits it via the SMS.

The SMS, however, limits a Korean text message to 40 characters, as well as limits the text message in other languages. Moreover only a few specific small keys are used to input the text message. Therefore, great amounts of time and effort are needed to input even a short message and often the short message becomes an abbreviation of what a user intends to express in the first place.

In an attempt to solve this problem, a mobile terminal may provide a variety of special characters along with the standard characters and digits. The characters and digits would vary with the programmed language, e.g., Korean, English, etc. FIG. 1 illustrates input modes supported by the conventional mobile terminal. As shown in FIG. 1, the mobile terminal displays available characters/digits in each input mode.

The illustrated mobile terminal of FIG. 1 also has a shortcoming in that a user must input a special character in a very complicated procedure (i.e., mode conversion, entry of an intended special character, input of key [CONFIRM], and etc.). Therefore, the conventional mobile terminal has limitations in the input of characters or symbols which can readily representing the emotions of a user in the form of an icon.

SUMMARY OF THE INVENTION

It is, therefore, an object of the present invention to provide an emoticon input method in a mobile terminal, which enables a user to easily input icons that represent his emotions.

It is another object of the present invention to provide an emoticon input method in a mobile terminal, which enables a user to easily enter a plurality of icons that represent his emotions by use of a series of special characters.

The foregoing and other objects are achieved by providing a method of easily inputting icons representing user emotions (emoticons). In the emoticon input method in a mobile terminal, a plurality of emoticons, formed by utilizing a plurality of typical characters and special characters in combination, are grouped and stored by groups in the mobile terminal. The mobile terminal enters an emoticon input mode, displays the stored emoticon groups, displays the emoticons of an emoticon group selected by a user, stores an emoticon selected by the user, and transmits an SMS message including at least one emoticon selected by the user.

BRIEF DESCRIPTION OF THE DRAWINGS

The above and other objects, features and advantages of the present invention will become more apparent from the following detailed description when taken in conjunction with the accompanying drawings in which:

FIG. 1 illustrates input modes supported in a conventional mobile terminal;

FIG. 5 illustrates groups of emoticons according to an embodiment of the present invention.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 2:
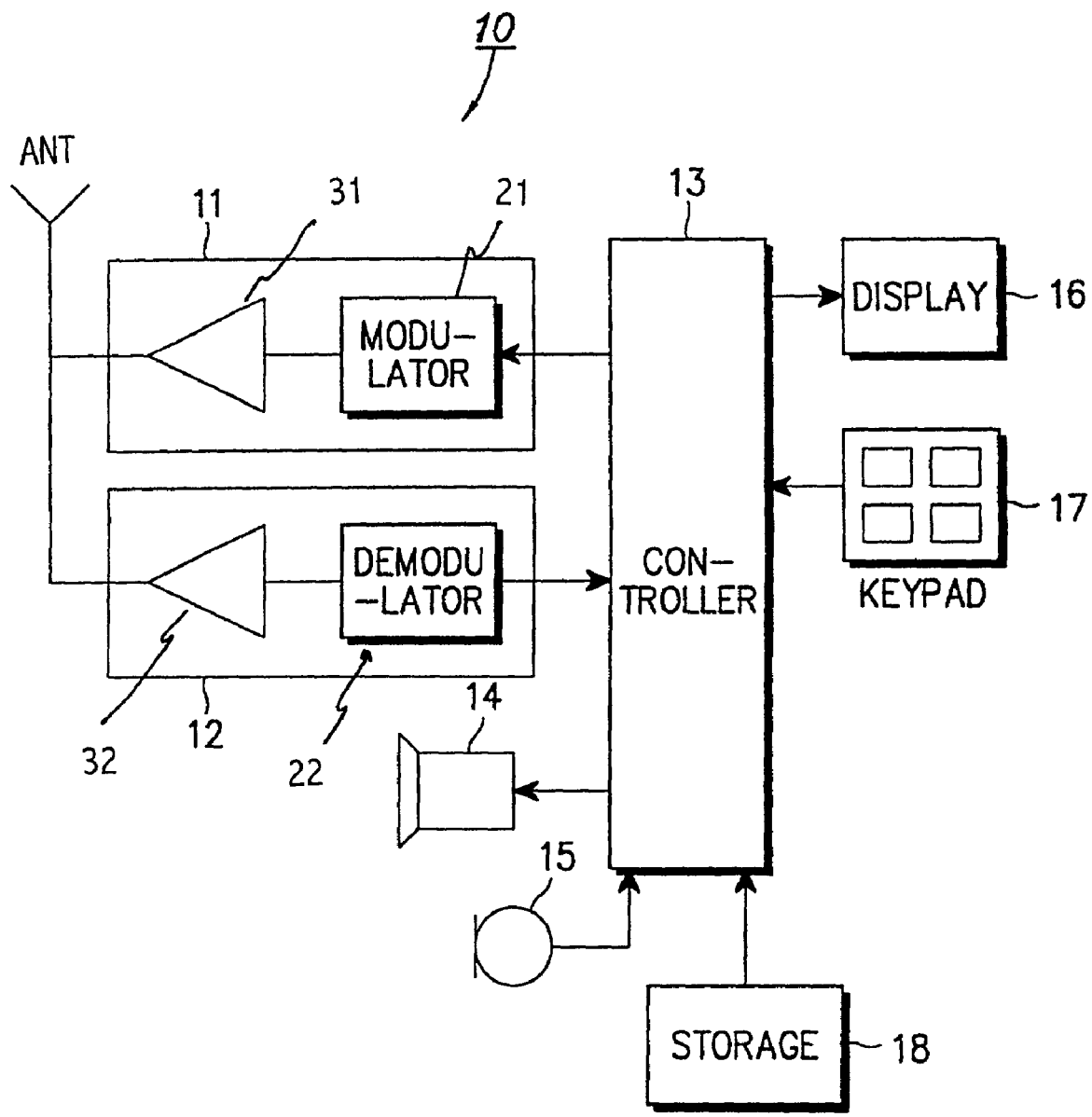
FIG. 2 is a schematic block diagram of a mobile terminal to which the present invention is applied.

FIG. 2 is a schematic block diagram of a mobile terminal to which the present invention is applied.

Referring to FIG. 2, a mobile terminal 10 includes a transmitter 11 with a modulator 21 and transmission amplifier 31 and a receiver 12 with a reception amplifier 32 and a demodulator 22 in order to exchange signals with a mobile communication system (not shown) that has a base station, an MSC (Mobile Switching Center), and an SMS center. Also shown is antenna ANT.

A display 16 outputs display data and text messages generated in the mobile terminal. An LCD (Liquid Crystal Display) can be used as the display 16. A key input portion 17 has a plurality of digit/character keys, function keys for user interfacing, and keys for voice calls. A keypad can be used as the key input portion 17.

A controller 13 includes a DSP (Digital Signal Processor), a microprocessor, and other circuits that controls the transmitter 11 and the receiver 12 to allow the user to conduct a voice call with another user through a speaker 14 and a microphone 15. The controller 100 also performs an emoticon input operation according to an embodiment of the present invention.

A storage 18 is comprised of a ROM (Read Only Memory) and a RAM (Random Access Memory) for storing programs and data, and a voice memory. The storage 18 stores an operation program for inputting emoticons and a plurality of emoticons in the form of a bit map according to the embodiment of the present invention. The plurality of emoticons are stored by groups in the storage 18 to facilitate selection of emoticons.

An emoticon is defined as a hieroglyphic character that is formed using a plurality of typical characters or special characters in combination to represent a user's emotions. The term "emoticon" is a compound word of emotion and icon (an image representing a computer program function). Emoticons are part of a language unique to cyber space, by which emotions, symbols, personalities, jobs, and objects are represented by using characters, symbols, and digits available on the keyboard of a computer. They are widely used in cyber space since they are easily understood and easily facilitate a description of an expression of subtle emotions of a user.

Emoticons are usually divided into two categories: oriental ones used among Asians including Koreans and Japanese, and occidental ones mainly used in the U.S. and Europe. Vertical hieroglyphics prevail in the former case, whereas horizontal ones prevail in the latter case. Therefore, storage 18 stores oriental or occidental emoticons according to the cultural area of a user.

In general, 2000 emoticons are used respectively in Asia and the U.S. & Europe and up to 50 emoticons are standardized. To ease selection, emoticons are stored by groups in a mobile terminal. Emoticon groups can be formed as shown below, for example.

1. facial expression: happiness/smile/greeting/love/nonsense/sleep/depression/shyness/tears/angerlfear/etc.
2. person: race/character/profession
3. animals: rabbit/cat/dog/ape/pig/goat/cow/rat
4. reptiles, amphibia: tadpole/frog/snake
5. fishes: goldfish/small octopus/shrimp/squid/sea horse/crab
6. insect: dragonfly/butterfly
7. plants: white rose/black rose/bouquet/tree
8. food: sushi/noodle/hamburger/Pepsi/Coke/candies
9. characters: Pikachu/Teletubbies FIG. 3 is a flowchart illustrating an emoticon input procedure according to the present invention and FIG. 4 illustrates operational displays in a mobile terminal according to the present invention.

Figure 3:
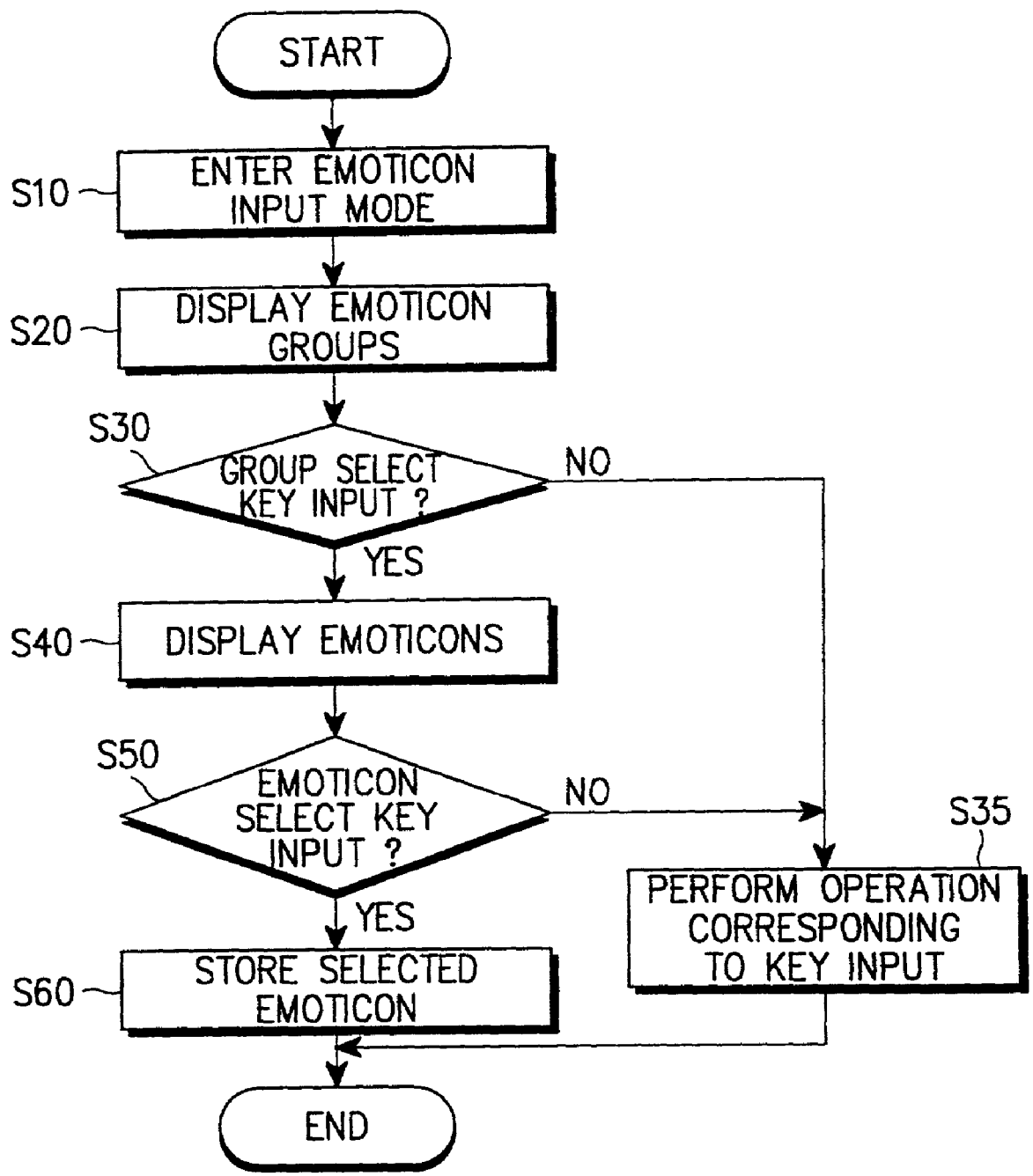
FIG. 3 is a flowchart illustrating an emoticon input operation according to the present invention.

Referring to FIG. 3, a user enters an emoticon input mode by manipulating keys in a mobile terminal in step S10. The mobile terminal sequentially displays pre-stored emoticon group names as a user scrolls through a menu in step S20 and determines whether the user has entered a group select key in step S30. If a key other than a group select key is input in step S30, the mobile terminal performs an operation corresponding to the key input in step S35. Upon input of the group select key in step S30, the mobile terminal sequentially displays the emoticons of the selected group as a user scrolls through a menu in step S40. In step S50, the mobile terminal determines whether the user has entered an emoticon select key. If the user enters a key other than an emoticon select key, the mobile terminal performs an operation corresponding to the key input in step S35. Upon input of an emoticon select key, the mobile terminal stores as part of a short message an emoticon selected by the input emoticon select key in step S60.

Figure 4:
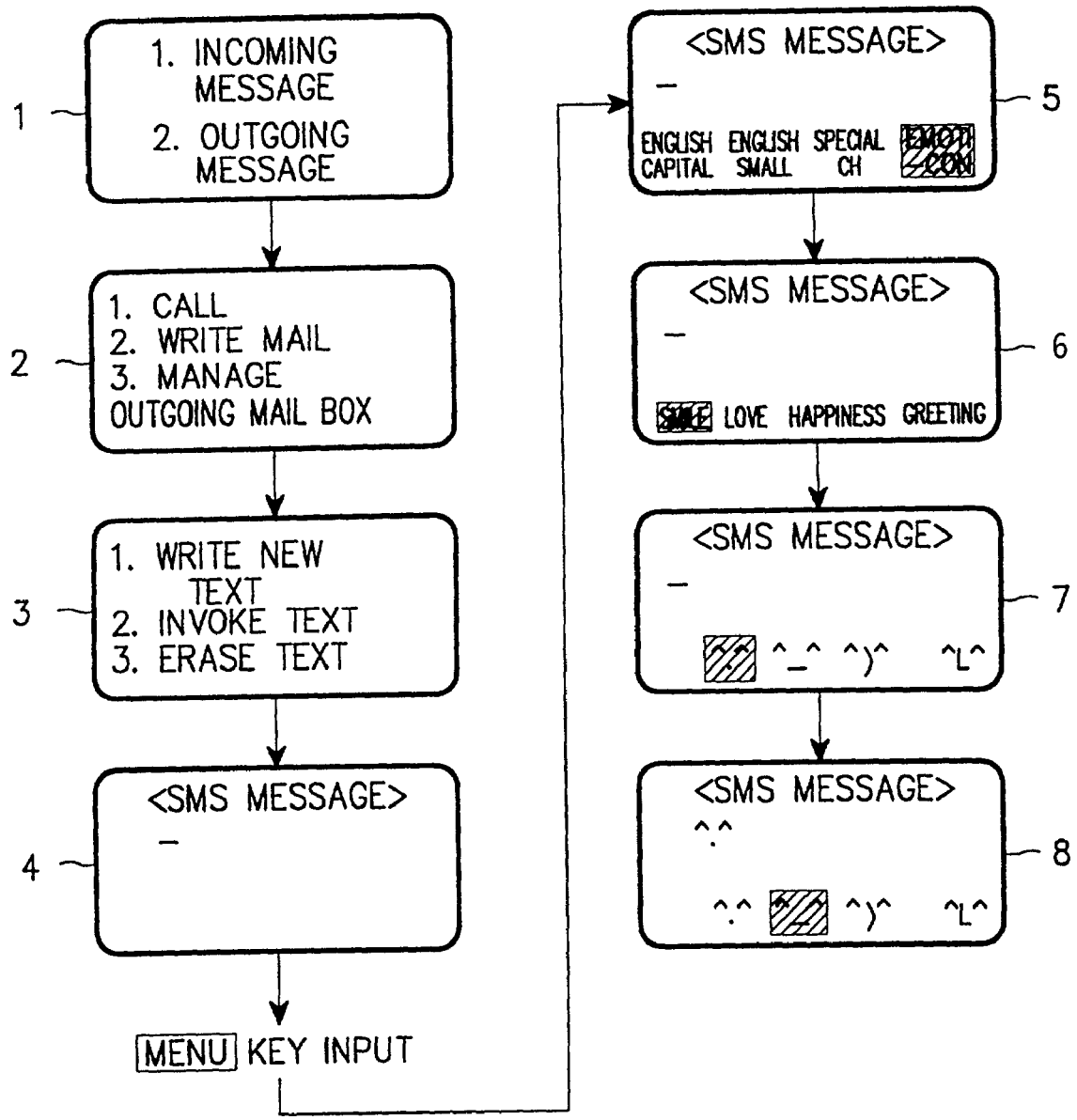
FIG. 4 illustrates operational displays of the mobile terminal according to the present invention.

Referring to FIG. 4, a procedure of displaying an emoticon representing a smile will be described. When the user invokes a message management function by pressing a predetermined key, for example, a message hot key, a display 1 is provided. If the user selects "2. outgoing message" by manipulating a directional key or a digit key in the display 1, a display 2 is provided. Then, if the user selects "2. write mail" in the display 2, a display 3 is provided. If the user selects "1. write new text" in the display 3, a display 4 is provided.

When the user presses a predetermined input mode conversion key, for example, [MENU], a display 5 is provided. The display 5 displays the other input modes available from the mobile terminal, that is, an English capital input mode, an English small input mode, a special character input mode, and an emoticon input mode. If the user selects "emoticon" in the display 5, the mobile terminal enters the emoticon input mode (S10 of FIG. 3) and displays the names of pre-stored emoticon groups, that is, smile, love, happiness, greeting, and etc. in a display 6 (S20 in FIG. 3).

FIG. 5 illustrates emoticon groups according to an embodiment of the present invention. As shown in FIG. 5, the emoticons are grouped into smile, love, happiness, greeting, and fear, though only the emoticons for smile and love are shown.

If the user selects "smile" in the display 6 by manipulating a left/right directional key, emoticons that belong to the group "smile" are displayed in a display 7. When the user chooses one of the "smile" emoticons "^.^" in the display 7, the selected emoticon is stored as part of the short message as shown in a display 8. Then, the user can input a text including typical characters, special characters, or emoticons within the range of a transmittable SMS message, by changing input modes.

After an intended text is completed, the user instructs the mobile terminal to transmit the SMS message including the emoticon "^.^". That is, when the user finishes the SMS message writing by pressing a key [CONFIRM], enters the telephone number of the other party, and then presses the key [CONFIRM], the mobile terminal transmits the stored message. After transmission of the message, the mobile terminal can store the transmitted message according to user control and then returns to an initial phone display.

Emoticons can be subdivided into upper groups and lower groups. The upper groups can be expression, person, animals, reptiles/amphibia, fish, insect, plants, food, and characters. For the upper group "expression", the lower groups can be smile/love/happiness/fear.

A plurality of emoticons are pre-stored in a mobile terminal so that a user easily select an intended emoticon in the present invention. In another embodiment, the user can add hieroglyphics to basic emoticons stored by a manufacturer. The hieroglyphics can be stored in three ways: the user directly stores them, receives them from a base station and the stores them, or downloads them from the Internet. The user can change and edit the emoticons stored in the mobile terminal.

The present invention has the following advantages:

(1) The present invention increases interest in writing a message, outgrowing the simplicity of transmission of only a text message by facilitating input of hieroglyphics without the need of selecting special characters, special symbols, and digits one by one, and facilitating storage of the hieroglyphics.

(2) Emoticon messages are written in a shorter time than writing a text message as well as forming hieroglyphics by selecting special characters, symbols, and digits one by one, because emoticon groups are effectively classified and their indexes are used in writing the emoticon messages. The emoticon input method of the present invention gives a great satisfaction to users due to its convenience and originality.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An emoticon input method in a mobile terminal, comprising the steps of:
creating, by a user, a plurality of emoticons within a range of a transmittable SMS (Short Message Service) message formed by utilizing a plurality of typical characters and special characters in combination;
grouping said plurality of emoticons and storing the emoticons by groups in the mobile terminal;
entering an emoticon input mode;
displaying a list of the stored emoticon groups;

selecting an emoticon group;

displaying the emoticons of an emoticon group selected by a user;

storing an emoticon selected by the user with an SMS message; and wherein the emoticons are downloaded into the mobile terminal from the Internet and stored in the mobile terminal.

2. The emoticon input method of claim 1, wherein the emoticons are stored by a manufacturer in the process of manufacturing.

3. The emoticon input method of claim 1, wherein the emoticons are created and stored directly by the user.

4. The emoticon input method of any of claim 1, wherein the emoticons are received from a base station and stored in the mobile terminal.

5. The emoticon input method of claim 1, further comprising the step of changing and editing the emoticons by the user.

6. An emoticon input method in a mobile terminal, comprising the steps of:

creating, by a user, at least one emoticon within a range of a transmittable SMS (Short Message Service) message, which is formed by utilizing a plurality of typical characters and special characters in combination;

storing the at least one emoticon in an emoticon group selected by a user among a plurality of emoticon groups comprised of previously grouped emoticons according to a specific reference;

displaying a list of the plurality of emoticon groups in an emoticon input mode;

displaying emoticons included in an emoticon group selected by a user among the plurality of emoticon groups;

selecting, by a user, at least one emoticon from the displayed emoticons;

transmitting an SMS message including the at least one emoticon selected by a user; and wherein the emoticons are downloaded into the mobile terminal from the Internet and stored in the mobile terminal.

7. The emoticon input method of claim 6, wherein the emoticons are formed and stored by a manufacturer in the process of manufacturing.

8. The emoticon input method of claim 6, wherein the emoticons are received from a base station and stored in the mobile station.

9. The emoticon input method of claim 6, further comprising the step of changing and editing the emoticons by the user.

10. The emoticon input method of claim 6, wherein the emoticon groups include upper groups and lower groups.

11. An emoticon input method in a mobile terminal, comprising the steps of:

entering an emoticon input mode;

displaying a list of a plurality of emoticon groups comprised of previously grouped emoticons within a range of a transmittable SMS (Short Message Service) message according to a specific reference in the emoticon input mode, wherein the emoticons are created by utilizing a plurality of typical characters and special characters in combination, and stored in the mobile terminal;

displaying emoticons included in an emoticon group selected by a user among the plurality of emoticon groups;

selecting, by a user, an emoticon from the displayed emoticons;

storing with an SMS message the emoticon which is selected by the user; and wherein the list of a plurality of emoticon groups and the emoticons are downloaded into the mobile terminal from the Internet and stored in the mobile terminal.

12. The emoticon input method of claim 11, wherein the list of emoticons and the emoticons are stored in the form of a bit map.

13. The emoticon input method of claim 11, further comprising the step of transmitting the SMS message including the stored emoticon.

14. The emoticon input method of claim 11, wherein the list of a plurality of emoticon groups and the emoticons are created and stored by the user.

15. The emoticon input method of claim 11, wherein the list of a plurality of emoticon groups and the emoticons are received from a base station and stored in the mobile terminal.

16. The emoticon input method of claim 11, further comprising the step of changing and editing the emoticons by the user.

* * * * *